United States Patent
Ray

[11] Patent Number: 6,132,655
[45] Date of Patent: Oct. 17, 2000

[54] RECLAMATION OF THERMOPLASTIC WASTES

[76] Inventor: Sam W. Ray, 3265 Golfing Green Dr., Farmers Branch, Tex. 75234

[21] Appl. No.: 08/364,541

[22] Filed: Dec. 27, 1994

Related U.S. Application Data

[63] Continuation of application No. 08/018,014, Feb. 16, 1993, abandoned.

[51] Int. Cl.[7] .................................................. B29B 13/02
[52] U.S. Cl. ............................ 264/68; 264/321; 264/911; 264/916
[58] Field of Search ................................ 264/68, 37, 126, 264/DIG. 69, 321, 911, 916

[56] References Cited

U.S. PATENT DOCUMENTS

| Re. 31,912 | 6/1985 | Fortuna et al. | 264/68 |
| 3,080,612 | 3/1963 | Buchmann | 264/DIG. 69 |
| 3,278,661 | 10/1966 | Beck | 264/68 |
| 3,531,562 | 9/1970 | Serrano et al. | 269/68 |
| 3,607,999 | 9/1971 | Corbett | 264/126 |
| 3,662,633 | 5/1972 | Bourgeois | 82/101 |
| 4,189,291 | 2/1980 | Longhi | 425/215 |
| 4,228,076 | 10/1980 | Pettingell | 264/321 |
| 4,413,969 | 11/1983 | McDonald | 425/217 |
| 4,504,436 | 3/1985 | Louvier | 264/DIG. 69 |
| 4,820,463 | 4/1989 | Raufast | 264/68 |
| 4,824,627 | 4/1989 | Hammer et al. | 264/279 |
| 4,877,840 | 10/1989 | Chu | 264/68 |
| 4,968,463 | 11/1990 | Levasseur | 264/37 |
| 5,102,326 | 4/1992 | Bacher et al. | 264/37 |
| 5,114,331 | 5/1992 | Umehara et al. | 425/200 |

FOREIGN PATENT DOCUMENTS

| 2462040 | 6/1976 | Germany | 264/DIG. 69 |
| 2609850 | 9/1977 | Germany | 264/68 |
| 2656484 | 10/1977 | Germany | 264/DIG. 69 |
| 3231237 | 2/1984 | Germany | 264/68 |
| 53-43754 | 4/1978 | Japan | 264/68 |

*Primary Examiner*—Allan R. Kuhns
*Attorney, Agent, or Firm*—Jack A. Kanz

[57] ABSTRACT

Thermoplastic foam is converted into useful products by simultaneously compressing and agitating particles of the foam. The particles are formed into a substantially unitary mass of hot softened material which can be immediately formed, cast or extruded into useful particles.

9 Claims, 2 Drawing Sheets

RECLAMATION OF THERMOPLASTIC WASTES

This is a continuation of application Ser. No. 08/018,014 filed Feb. 16, 1993, entitled Reclamation of Thermoplastic Wastes, now abandoned.

This invention relates to reclamation and reuse of thermoplastic materials. More particularly, it relates to densifying and reusing expanded or foamed thermoplastic products, waste materials and the like and reforming the same into useable products.

Many thermoplastic materials, such as polyethylene and polystyrene, are foamed or expanded to contain gas cells or the like for use as packaging or insulating materials. Typically, polystyrene foam is expanded from a density of approximately sixty-two (62) pounds per cubic foot to less than one (1) pound per cubic foot. The expanded foam is then used for packaging materials, insulating materials, etc. However, cutting such expanded thermoplastic materials to specific sizes and shapes for specific uses creates great volumes of scrap or waste materials which present a disposal problem. Since the material is expanded and in the form of chips or fragments, it occupies high volumes of space. Similarly, expanded or foamed materials used as packing materials must generally be reused or destroyed. Disposal of such wastes by burning produces toxic fumes. Because it is expanded and bulky, conventional disposal systems become rapidly overburdened and expensive.

Waste or scrap expanded thermoplastic material can be recycled and densified for recycling by heating the material to its softening point and permitting the trapped gas to escape. Unfortunately, heating a foamed product consumes tremendous amounts of energy and thus has not proven to be a commercially viable reclamation process.

In accordance with the present invention, expanded or foamed thermoplastic material, such as polystyrene, polyethylene, etc., is densified by confining a charge of particles thereof in a limited space and simultaneously reducing the volume while agitating the particles. The agitation of particles against particles (as well as molecular agitation) rapidly heats the material to a temperature above its softening point and causes the material to coalesce into a unitary liquid mass. By simultaneously agitating and compressing the material, the energy produced by frictional forces is contained within the mass of material itself, thus producing a liquid mass with minimum consumption of energy. Furthermore, the energy used. is essentially confined within the material mass so that very little energy in the form of heat is wasted or lost to the surrounding atmosphere.

In another embodiment of the invention, the molten mass is immediately formed into a useable product by molding, extrusion or the like so that the energy of formation contained within the molten mass is conserved. Thus thermoplastic waste material can be rapidly converted into useable product with minimum consumption of energy. The methods and apparatus of the invention therefore provide means for disposing of otherwise hazardous waste materials and for converting such waste materials into a useable product with minimum consumption of energy. Other features and advantages of the invention will become more readily understood from the following detailed description taken in connection with the appended claims and attached drawing.

DETAILED DESCRIPTION OF THE INVENTION

Figure 1:
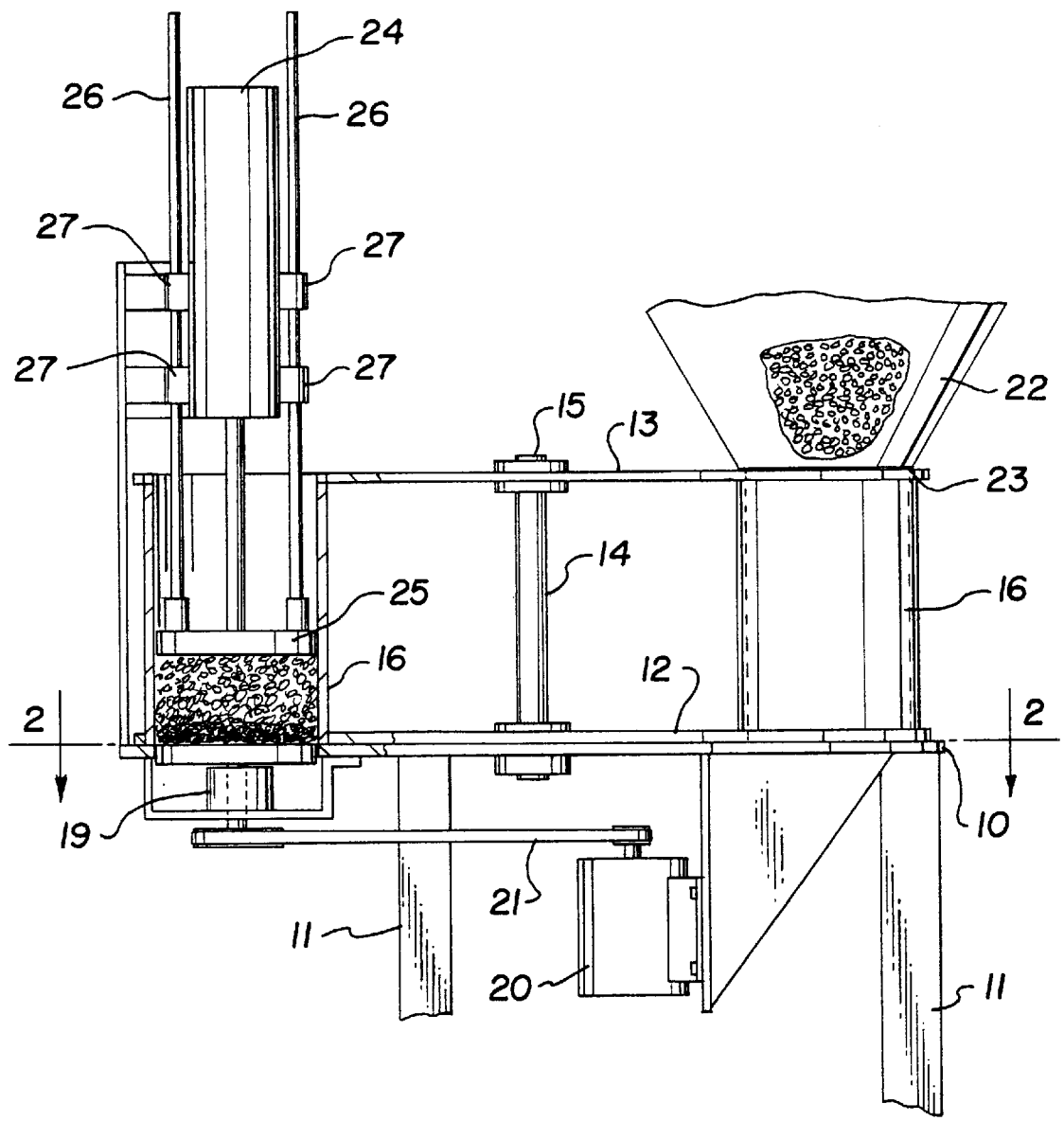
FIG. 1 is an elevational view of a preferred embodiment of apparatus for practicing the preferred method of the invention.

Apparatus for practicing the invention as illustrated in the drawing comprises a support table 10 having a flat top and suitable support structure such as legs 11. Parallel plates 12 and 13 are mounted on a spool 14 and supported on shaft 15 extending centrally through table 10 so that bottom plate 12 and top plate 13 rotate in unison in parallel planes parallel with the top surface of table 10. The lower surface of bottom plate 12 is positioned adjacent the top of table 10 and may rotate thereagainst.

Cylindrical chambers 16 (two of which are illustrated in the drawing) extend from lower plate 12 to top plate 13 and the portions of plates 12 and 13 defining the ends of the cylinders removed so that open-ended cylinders 16 may rotate in a circle about shaft 15. The bottom end of each cylinder is enclosed by the top surface of table 10 and the top end of each cylinder 16 is open.

Figure 2:
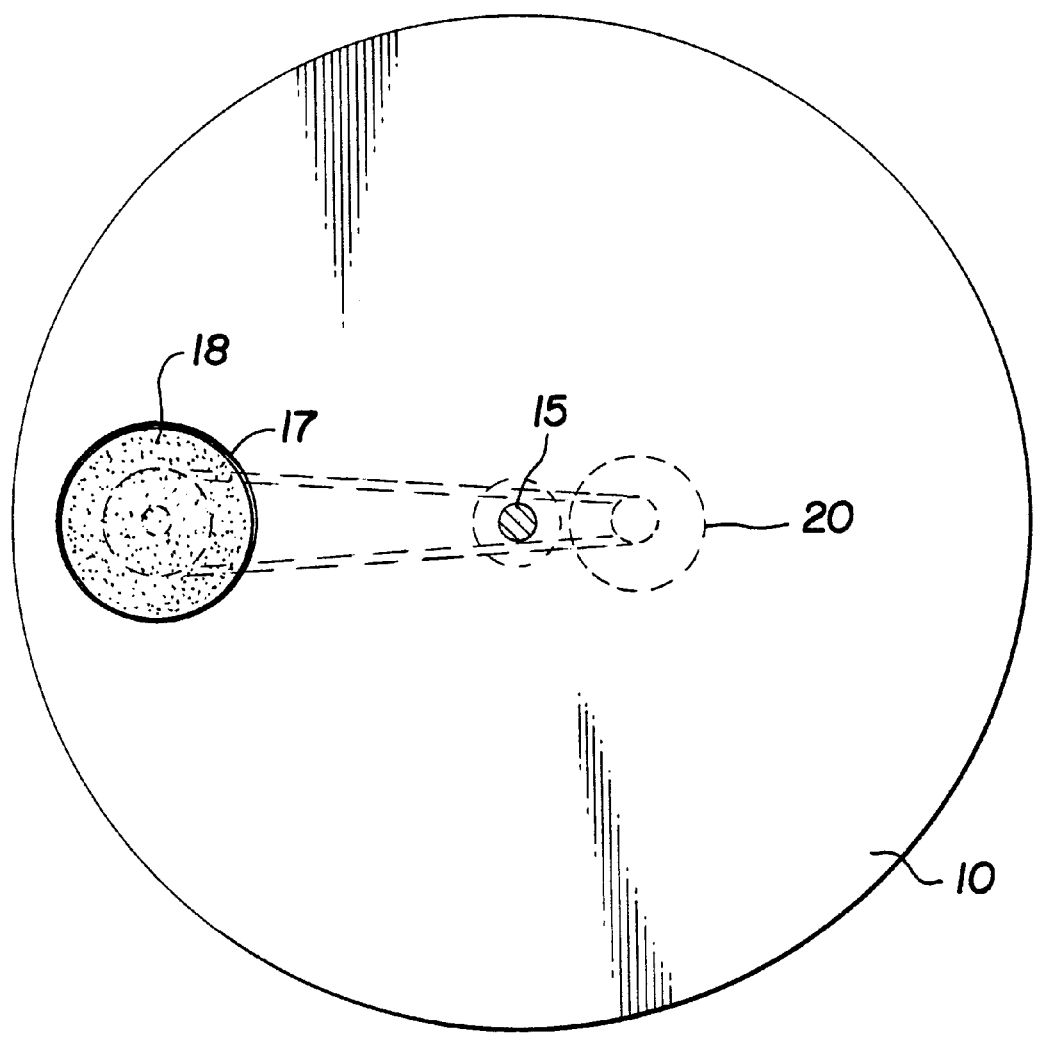
FIG. 2 is a view of the apparatus of FIG. 1 taken through line 2—2.

An aperture 17 is formed in table 10 (see FIG. 2) which has approximately the same dimensions of the lower open end of cylinder 16. Aperture 17 is positioned in table 10 so that as plates 12 and 13 are rotated, cylinders 16 are consecutively moved into alignment coaxially with the aperture 17. A rotatable disc 18 is journaled in housing 19 and aligned with its upper surface substantially parallel with the upper surface of table 10. The disc 18 is mounted on a shaft driven by drive motor 20 and belt 21, respectively. It will thus be observed that when drive motor 20 is activated, disc 18 rotates in aperture 17 but substantially fills the aperture 17, thus enclosing the lower open end of cylinder 16.

A hopper 22 mounted above the table has an open end 23 with dimensions substantially conforming to and mating with open end of cylinder 16 when cylinder 16 is located at a predetermining position which is not coaxial with disc 18. Comminuted material contained in hopper 20 will thus flow into and fill cylinder 16. Since the lower end of cylinder 16 is open but adjacent the top surface of table 10, the lower end of cylinder 16 is closed and the cylinder is filled to capacity by comminuted material from hopper 22. When cylinder 16 is filled, plates 12 and 13 are rotated to move cylinder 16 into coaxial alignment with disc 18. It will be observed that since table 10 is a flat surface, the table 10 acts as a stationary bottom enclosure for moving cylinder 16 and the material contained in cylinder 16 merely slides over the top surface of table 10 until the cylinder is aligned with disc 18. Similarly, since top plate 13 is also has a flat top surface, rotation of top plate 13 under hopper 22 acts as a gate to stop flow of material from hopper 22 until another cylinder 16 is aligned therewith. While only two (2) cylinders 16 are illustrated, any convenient number may be used and plates 12, 13 rotated to consecutively position one cylinder in alignment with disc 18 while another cylinder 16 is aligned with open end 23 for filing.

When a cylinder 16 filled with comminuted material is rotated into alignment coaxial with the disc 18, the top of the cylinder is also positioned in coaxial alignment with a cylinder 24 which carries a top disc 25. Disc 25 is thus also coaxially aligned with disc 18. Cylinder 24 may be a hydraulic or air actuated cylinder and, when activated, drives top disc 25 into cylinder 16. In order to prevent rotation of the top disc 25, elongated guides 26 are journaled in bushings 27 and attached to top disc 25. Thus as the top disc 25 moves downwardly into cylinder 16, rotation of top disc 25 is prevented.

When a loaded cylinder 16 is aligned between top disc 25 and disc 18, drive motor 20 is activated to rotate disc 18. Simultaneously, cylinder 24 is activated to urge top disc 25 toward bottom disc 18, thus reducing the volume in cylinder 16. Rotation of disc 18 causes extreme agitation and frictional contact between particles of material contained within the cylinder. As the volume of the cylinder is reduced, the friction is increased and the volume of material is rapidly reduced. Further agitation of the articles causes internal frictional heating resulting in softening of the material and formation a unitary molten mass.

Without being bound by any theory, it is believed that the extreme efficiency of the process is attributable to friction between the particles of material on a macro level as well as micro level. From experiments conducted, it is clear that heat is generated within the material itself and not by friction between the containing cylinder and the material.

While comminuted particles of foamed materials are illustrated, it only necessary that the particle be small enough to fit into cylinder 16 and be agitated by rotation of disc 18. Agitation of the particles causes the particles to rub against each other and thereby grind each other into smaller particles. To aid in agitation of the particles, the surface of disc 18 may be roughened or covered with a roughening material such as sand paper or the like.

Demonstration apparatus was constructed substantially as illustrated in the drawing utilizing a steel cylinder 16 fourteen (14) inches high and twelve (12) in inches in diameter. The rotating disc 18 was approximately twelve (12) inches in diameter and driven by a 7.5 horsepower electric motor to rotate at approximately 1800 rpm. The cylinder 16 was loaded with a charge of comminuted polystyrene and cylinder 24 activated to force disc 25 toward the opposite end of the cylinder, thereby compressing the polystyrene foam. Using a pressure of about two (2) to three (3) pounds per square inch to force disc 25 into cylinder 16, the foam was reduced to a unitary molten mass occupying approximately 0.011 cubic feet in about 15 to 30 seconds. The temperature of the molten mass was determined to be approximately 250° C.

Repeated cycles of operations as described above produced substantially identical results. However, the cylinder 16 remained substantially at room temperature and the temperature of the rotating disc 18 never exceeded about 50° C. Accordingly, it is believed that friction between particles of the loose foam and the internal friction of the mass as a result of the kneading action imparted to the mass by the rotating disc 18 results in extremely rapid heating of the interior of the mass of material to raise it to its softening point. Not only is the material rapidly reduced to a softened, cohesive and unitary mass, the formed material is coalesced into an essentially gas-free liquid. Furthermore, the heat generated during the compression process is retained within the mass of material and may be used to form the material into useful products without reheating. For example, the molten mass may be immediately placed in a suitable mold or extrusion device and molded or extruded into the desired form to produce any of a variety of useful articles. The end product, of course, has a, density of approximately sixty-two (62) pounds per cubic foot (in the case of polystyrene). Alternatively, the densified product may be shipped to a recycle center for reuse.

The process and apparatus of the invention work equally well with foams of polystyrene and polyethylene. Other foamed thermoplastic materials will produce similar results. However, the rate of compression, etc., may vary depending on the density of the foam, the softening point of the base material, etc. Furthermore, particles of non-foamed thermoplastic materials such as ABS plastic may also be reformed into a heated mass in the same manner and may even be mixed with foamed materials such as polystyrene to produce a blended finished product.

It should be noted that the invention advantageously produces a substantially unitary mass of material which is at a temperature above the softening point of the thermoplastic material. Thus, the softened mass may be immediately transformed into any desired shape without adding substantial energy in the form of heat. Furthermore, suitable dyes, etc., may be added to the material at various stages in the process to color the end product. For example, when using white expanded polystyrene, the end product resembles a somewhat waxy-appearing marble. However, by introducing small amounts dye or other material, the molten mass may be formed into parts which have a distinctive marble-like appearance. Other additives may be introduced to yield other patterns, colors or visual effects as well as physical characteristics. Similarly, fire retardant materials may be added or other materials added which change the physical properties of the end product. Accordingly, waste thermoplastic foam may be inexpensively converted using the methods and apparatus of the invention into an almost endless variety of useful and/or ornamental products.

It is has been determined that polyethylene foams densified as described above produce a highly dense and extremely resilient. material which does not fracture under extreme stress. The polystyrene product is extremely dense and resilient.

While the chemical and/or physical nature of the reforming process of the invention is not fully understood, the forgoing demonstrates that the process has wide application in densifying otherwise unusable and/or undesirable thermoplastic materials and converting such otherwise unusable materials into useful products with minimum consumption of energy.

While the invention has been described with particular reference to a specific embodiments thereof, it is to be understood that the forms of the invention shown and described in detail are to be taken as preferred embodiments thereof. Various changes and modifications may be resorted to without departing from the spirit and scope of the invention as defined by the appended claims.

What is claimed:

1. A method of densifying expanded thermoplastic material without injecting external heat comprising the steps of:
   (a) confining particles of expanded thermoplastic material in a container; and
   (b) reducing the volume of said container and simultaneously uniformly agitating said particles until substantially all said particles form a single substantially unitary mass of softened material within said container.

2. A method set forth in claim 1 wherein said particles are contained within a cylinder; said volume is reduced by urging one end of said cylinder toward the opposite end of said cylinder; and the particles are agitated by rotating one end of said cylinder with respect to the remainder of said cylinder.

3. A method of reclaiming thermoplastic material without injecting external heat comprising the step of:
   (a) compressing particles of thermoplastic material while simultaneously uniformly agitating all said thermoplastic material particles until a single substantially unitary mass of hot softened material is formed; and (b) forming said mass of material into a useful article while said material remains hot and softened.

4. The method set forth in claim 3 wherein said mass of material is formed into a useful article by extrusion before the mass of softened material is allowed to substantially cool.

5. A method as set forth in claim 3 wherein said mass of material is formed into a useful article by transfer molding using the heat generated during agitation of the particles to maintain the mass of material in a softened state for molding.

6. A method of densifying expanded thermoplastic material without injecting external heat comprising the steps of:

(a) confining particles of expanded thermoplastic material in a container; and (b) reducing the volume of said container while simultaneously uniformly agitating substantially all said particles until said thermoplastic material reaches a temperature of about 250° C.

7. A method as set forth in claim 6 wherein said agitation is continued until said particles form a substantially unitary mass of softened material.

8. A method as set forth in claim 6 wherein said particles are contained within a cylinder; said volume is reduced by urging one end of said cylinder toward the opposite end of said cylinder; and the particles are agitated by rotating one end of said cylinder with respect to the remainder of said cylinder.

9. A method of densifying expanded thermoplastic material without injecting external heat comprising the steps of:

(a) confining particles of expanded thermoplastic material in a cylinder; and (b) reducing the volume of said cylinder while simultaneously uniformly agitating substantially all said particles by urging one end of said cylinder toward the opposite end of said cylinder and coaxially rotating one end of said cylinder with respect to the remainder of said cylinder.

\* \* \* \* \*